(12) United States Patent
Zhou et al.

(10) Patent No.: US 7,330,003 B2
(45) Date of Patent: Feb. 12, 2008

(54) BACKLIGHT CONTROL CIRCUIT WITH TWO TRANSISTORS

(75) Inventors: Tong Zhou, Shenzhen (CN); Jin-Liang Xiong, Shenzhen (CN); Jia-Hui Tu, Shenzhen (CN); Hua Xiao, Shenzhen (CN)

(73) Assignees: Innocom Technology (Shenzhen) Co., Ltd., Shenzhen, Guangdong Province (CN); Innolux Display Corp., Chu-Nan, Miao-Li County (TW)

( * ) Notice: Subject to any disclaimer, the term of this patent is extended or adjusted under 35 U.S.C. 154(b) by 0 days.

(21) Appl. No.: 11/592,940

(22) Filed: Nov. 3, 2006

(65) Prior Publication Data

US 2007/0109253 A1   May 17, 2007

(30) Foreign Application Priority Data

Nov. 3, 2005   (CN) .......................... 2005 1 0100951

(51) Int. Cl.
*H05B 37/00* (2006.01)

(52) U.S. Cl. ...................... 315/318; 315/312; 315/128; 315/291; 315/307; 345/102

(58) Field of Classification Search ................ 315/312, 315/318, 320, 291, 307, 125, 128, 195, 169.1, 315/169.3, 294, 224; 345/102; 349/34, 349/42, 46

See application file for complete search history.

(56) References Cited

U.S. PATENT DOCUMENTS

| | | | | |
|---|---|---|---|---|
| 6,469,454 | B1 * | 10/2002 | Mader et al. | ................ 315/291 |
| 6,841,947 | B2 * | 1/2005 | Berg-johansen | ......... 315/169.3 |
| 6,909,238 | B2 | 6/2005 | Huang | |
| 2006/0284576 | A1 * | 12/2006 | Le et al. | ...................... 315/312 |
| 2007/0097283 | A1 * | 5/2007 | Zhou et al. | .................... 349/46 |

* cited by examiner

*Primary Examiner*—Haissa Philogene
(74) *Attorney, Agent, or Firm*—Wei Te Chung

(57) ABSTRACT

An exemplary backlight control circuit (200) includes two load circuits (210), a pulse width modulation integrated circuit (PWM IC) (250) having a current sampling pin (251), a switching circuit (270), a first input circuit (230) and a second input circuit (240) including an input resistor. Each load circuit includes a backlight (211, 221) and an output end (212, 222). The first input circuit includes a diode (231), a resistor (232), a capacitor (233) and a voltage division resistor (234). A negative terminal of the diode is connected to ground via the resistor and the capacitor respectively, and is connected to the switching circuit. A positive terminal of the diode is connected to one of the output end of the load circuits. The other one of the output ends of the load circuits is connected to the current sampling pin via the input resistor.

12 Claims, 3 Drawing Sheets

BACKLIGHT CONTROL CIRCUIT WITH TWO TRANSISTORS

The present invention relates to a backlight control circuit typically used in a liquid crystal display (LCD).

GENERAL BACKGROUND

An LCD has the advantages of portability, low power consumption, and low radiation, and has been widely used in various portable information products such as notebooks, personal digital assistants (PDAs), video cameras and the like. Furthermore, the LCD is considered by many to have the potential to completely replace CRT (cathode ray tube) monitors and televisions.

A typical LCD includes an LCD panel, a plurality of backlights for illuminating the LCD panel, an inverter circuit for driving the backlights, and a backlight control circuit. The backlight control circuit generally includes a pulse width modulation integrated circuit (PWM IC) for driving the inverter circuit, and a backlight protection circuit for shutting down the PWM IC when any one of the backlights has an open circuit or a short circuit connecting to ground.

FIG. 3 is an abbreviated diagram of a typical backlight control circuit used in an LCD. The backlight control circuit 100 includes four load circuits 110, a PWM IC 150, and a backlight protection circuit (not labeled). The backlight protection circuit includes a first transistor 171, a current limiting resistor 172, and an input circuit 130.

Each load circuit 110 includes a backlight 111 and a backlight inspecting circuit 113 connected in series between a power supply (not shown) and ground. The backlight inspecting circuit 113 includes an output end 112. The output end 112 provides a high voltage when the corresponding backlight 111 works. The output end 112 provides a low voltage when the corresponding backlight 111 has an open circuit or a short circuit connecting to ground.

The PWM IC 150 includes a current sampling pin 151. The PWM IC 150 stops working if the current sampling pin 151 has a low voltage.

The first transistor 171 includes a source electrode "S", a drain electrode "D", and a gate electrode "G". The source electrode "S" is connected to ground. The drain electrode "D" is connected to the current sampling pin 151 of the PWM IC 150. The gate electrode "G" is connected to a power supply via the current limiting resistor 172. The power supply is provided by a power pin (not labeled) of the PWM IC 150.

The input circuit 130 includes four diodes 131, four resistors 132, four capacitors 135, a second transistor 1332, a third transistor 1333, a fourth transistor 1334, and a fifth transistor 1335. Each transistor 1332, 1333, 1334, 1335 includes a source electrode "S", a drain electrode "D", and a gate electrode "G". The drain electrode "D" of the second transistor 1332 is connected to the gate electrode "G" of the first transistor 171. The drain electrode "D" of the third transistor 1333 is connected to the source electrode "S" of the second transistor 1332. The drain electrode "D" of the fourth transistor 1334 is connected to the source electrode "S" of the third transistor 1333. The drain electrode "D" of the fifth transistor 1335 is connected to the source electrode "S" of the fourth transistor 1334. The source electrode "S" of the fifth transistor 1335 is connected to ground. The gate electrodes "G" of the second, third, fourth, and fifth transistors 1332, 1333, 1334, 1335 are connected to negative terminals of the four diodes 131, respectively. Positive terminals of the four diodes 131 are respectively connected to the output ends 112 of the backlight inspecting circuits 113. Each of the gate electrodes "G" of the second, third, fourth, and fifth transistors 1332, 1333, 1334, 1335 is connected to ground via the corresponding resistor 132, and is connected to ground via the corresponding capacitor 135.

The first transistor 171, the second transistor 1332, the third transistor 1333, the fourth transistor 1334 and the fifth transistor 1335 are negative-channel metal oxide semiconductor (NMOS) type transistors.

The operation of the backlight control circuit 100 is as follows. When all the backlights 111 work normally, each of the output ends 112 provides a high voltage to the corresponding gate electrode "G" of the second, third, fourth, and fifth transistor 1332, 1333, 1334, 1335 via the corresponding diode 131. Then the second, third, fourth, and fifth transistors 1332, 1333, 1334, 1335 are switched to an activated state, and the gate electrode "G" of the first transistor 171 is connected to ground via the activated second, third, fourth, and fifth transistors 1332, 1333, 1334, 1335. Thus the first transistor 171 is turned off, and the current sampling pin 151 of the PWM IC 150 maintains an original working voltage.

When any one of the backlights 111 has an open circuit or has a short circuit connecting to ground, the corresponding output end 112 provides a low voltage to the corresponding gate electrode "G" of the second, third, fourth, and fifth transistors 1332, 1333, 1334, 1335 via the corresponding diode 131. Then the corresponding second, third, fourth, or fifth transistor 1332, 1333, 1334, 1335 is turned off, so that the gate electrode "G" of the first transistor 171 is charged to a high voltage by the power supply via the current limiting resistor 172. Thus the first transistor 171 is switched to an activated state, and the current sampling pin 151 of the PWM IC 150 is connected to ground via the activated first transistor 171. Consequently, the current sampling pin 151 of the PWM IC 150 is charged to a low voltage, and the PWM IC 150 stops working.

The backlight control circuit 100 includes the five transistors 171, 1332, 1333, 1334, 1335 needed to carry out the function of protecting the backlights 111. Further, the number of transistors needed increases with the number of backlights 111 used in the LCD. Consequently, the cost of the backlight control circuit 100 is high, particularly in the case where the number of backlights 111 is large.

It is desired to provide a backlight control circuit used typically in an LCD which overcomes the above-described deficiency.

SUMMARY

In one preferred embodiment, a backlight control circuit includes a first load circuit, a second load circuit, a PWM IC, a switching circuit, a first input circuit, and a second input circuit having an input resistor. Each load circuit includes a backlight and an output end. The PWM IC includes a current sampling pin. The switching circuit includes a first transistor, a second transistor, a current limiting resistor, and a bias resistor. The first transistor includes an emitter electrode connected to ground, a collector electrode connected to the sampling pin of the PWM IC, and a base electrode. The second transistor includes an emitter electrode connected to ground, a drain electrode connected to the base electrode of the first transistor, and a base electrode connected to the ground via the bias resistor. The first input circuit includes a diode, a first resistor, a first capacitor and a voltage division resistor. A negative terminal of the diode is connected to ground via the first resistor and the first capacitor respectively, and is also connected to the base electrode of the second transistor via the first voltage division resistor. A positive terminal of the diode is connected to one of the output end of the load circuits. The other one of the output ends of the load circuits is connected to the current sampling pin via the input resistor.

Advantages and novel features of the above-described circuit will become more apparent from the following detailed description when taken in conjunction with the accompanying drawings.

DETAILED DESCRIPTION OF PREFERRED EMBODIMENTS

Reference will now be made to the drawings to describe the present invention in detail.

Figure 1:
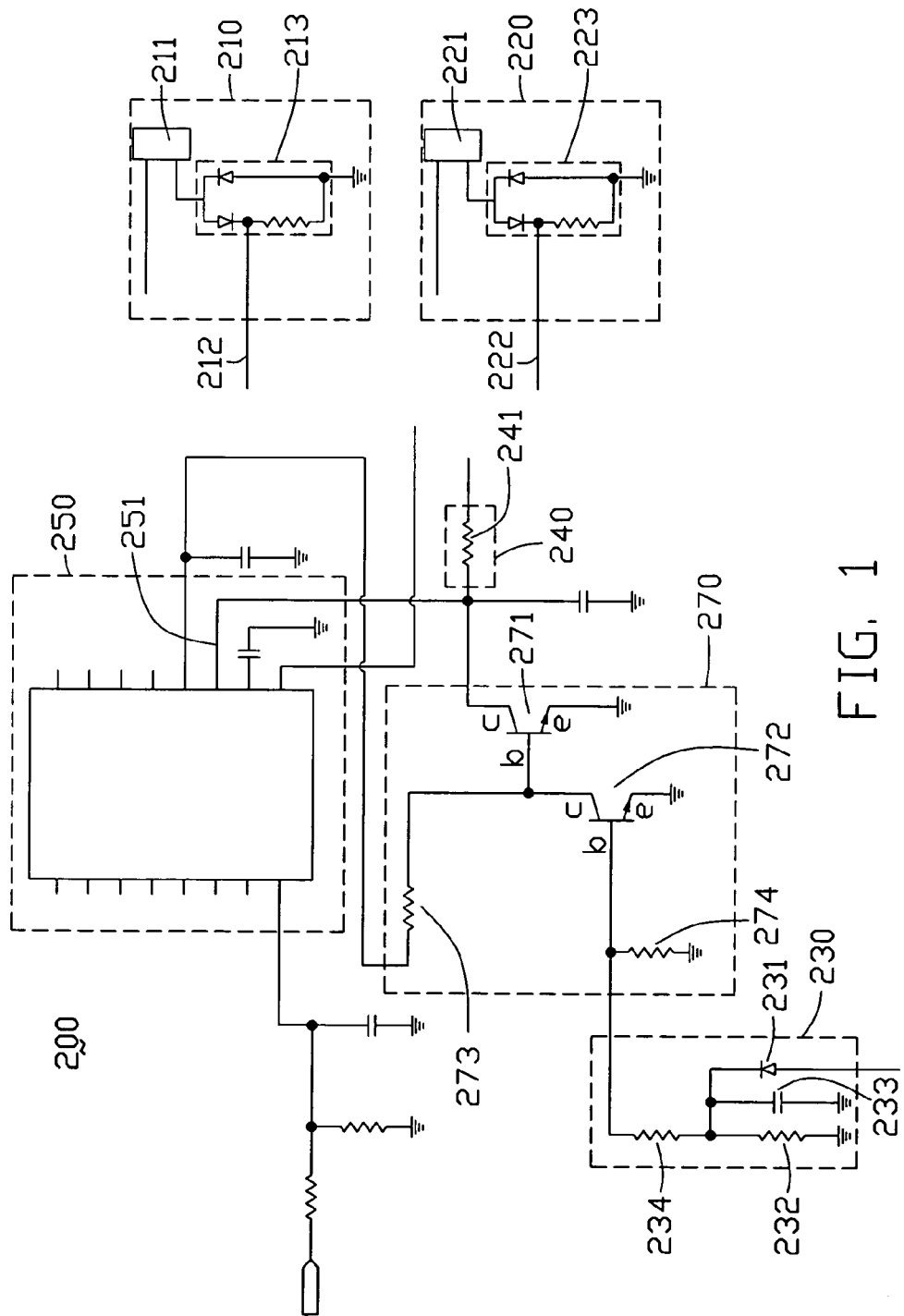
FIG. 1 is an abbreviated diagram of a backlight control circuit according to a first embodiment of the present invention, the backlight control circuit typically being used in an LCD.

FIG. 1 is an abbreviated diagram of a backlight control circuit according to a first embodiment of the present invention, the backlight control circuit typically being used in an LCD. The backlight control circuit 200 includes two load circuits 210, 220, a PWM IC 250, and a backlight protection circuit (not labeled). The backlight protection circuit includes a switching circuit 270, a first input circuit 230, and a second input circuit 240.

The load circuit 210 includes a backlight 211 and a backlight inspecting circuit 213 connected in series between a power supply (not shown) and ground. The backlight inspecting circuit 213 includes an output end 212. The load circuit 220 includes a backlight 221 and a backlight inspecting circuit 223 connected in series between a power supply (not shown) and ground. The backlight inspecting circuit 223 includes an output end 222. Each of the output ends 212, 222 provides a high voltage when the corresponding backlight 211 or backlight 221 works. Each of the output ends 212, 222 provides a low voltage when the corresponding backlight 211 or backlight 221 has an open circuit or a short circuit connecting to ground.

The PWM IC 250 includes a current sampling pin 251. The PWM IC 250 stops working if the current sampling pin 251 has a low voltage.

The switching circuit 270 includes a first transistor 271, a second transistor 272, a current limiting resistor 273, and a bias resistor 274. Each of the transistors 271, 272 includes an emitter electrode "e", a collector electrode "c", and a base electrode "b". The emitter electrodes "e" of the first and second transistors 271, 272 are connected to ground. The collector electrode "c" of the first transistor 271 is connected to the current sampling pin 251 of the PWM IC 250. The collector electrode "c" of the second transistor 272 is connected to the base electrode "b" of the first transistor 271, and is connected to a direct current power supply via the current limiting resistor 273. The base electrode "b" of the second transistor 272 is connected to ground via the bias resistor 274. The power supply is provided by a power pin (not labeled) of the PWM IC 250, and is typically a five volt direct current power supply.

The first input circuit 230 includes a diode 231, a resistor 232, a capacitor 233, and a voltage division resistor 234. A negative terminal of the diode 231 is connected to ground via the resistor 232 and via the capacitor 233 respectively, and is connected to the base electrode "b" of the second transistor 272 via the voltage division resistor 234. A positive terminal of the diode 231 is connected to the output end 222 of the backlight inspecting circuit 223.

The second input circuit 240 includes an input resistor 241. The output end 212 of the backlight inspecting circuit 213 is connected to the current sampling pin 251 of the PWM IC 250 via the input resistor 241.

The diode 231 can for example be an SN4148 type diode. A resistance of the current limiting resistor 273 is preferably 1MΩ. A resistance of the voltage division resistor 234 is preferably 5KΩ. A resistance of the bias resistor 274 is preferably 1.5KΩ. The PWM IC 250 can for example be an OZ9910G type PWM IC. The first transistor 271 and the second transistor 272 can be negative-channel metal oxide semiconductor (NMOS) type transistors or negative-positive-negative (NPN) type transistors.

Generally, operation of the backlight control circuit 200 is as follows. When the backlight 211 of the load circuit 210 works, the output end 212 of the backlight inspecting circuit 213 provides a high voltage to the current sampling pin 251 of the PWC IC 250 via the input resistor 241. When the backlight 221 of the load circuit 220 works, the output end 222 of the backlight inspecting circuit 223 provides a high voltage to the base electrode "b" of second transistor 272 via the diode 231 and the voltage division resistor 234 in that order. Then the second transistor 272 is switched to be in an activated state, and the base electrode "b" of the first transistor 271 is connected to ground via the activated second transistor 272. Thus, the first transistor 271 is turned off, and the current sampling pin 251 of the PWM IC 250 maintains the high voltage and keeps working.

When the backlight 221 has an open circuit or a short circuit connecting to ground, the output end 222 of the backlight inspecting circuit 223 provides a low voltage to the base electrode "b" of second transistor 272 via the diode 231 and the voltage division resistor 234 in that order. Then the second transistor 272 is turned off, so that the base electrode "b" of the first transistor 271 is charged to a high voltage by the direct current power supply via the current limiting resistor 273. Thus the first transistor 271 is switched to be in an activated state, so that the current sampling pin 251 of the PWM IC 250 is connected to ground via the activated first transistor 271. Then the current sampling pin 251 of the PWM IC 250 is discharged to the low voltage, and the PWM IC 250 stops working.

When the backlight 211 has an open circuit or a short circuit connecting to ground, the output end 212 of the backlight inspecting circuit 213 directly provides a low voltage to the current sampling pin 251 of the PWM IC 250 via the input resistor 241. Thus, the PWM IC 250 stops working.

The backlight control circuit 200 needs only two transistors 271, 272 to carry out the function of protecting the backlights 211, 221. Therefore, the backlight control circuit 200 has low cost.

Figure 2:
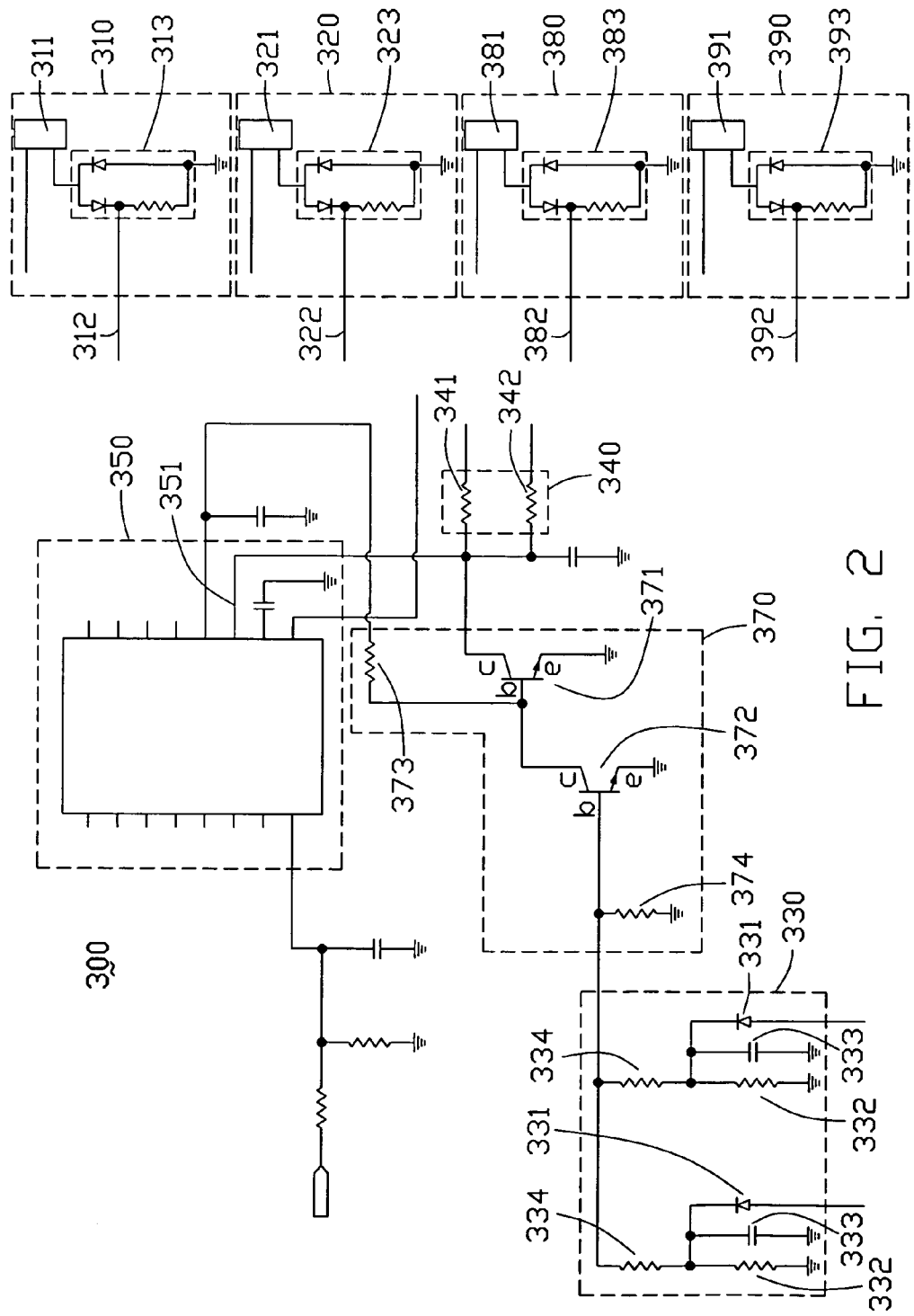
FIG. 2 is an abbreviated diagram of a backlight control circuit according to a second embodiment of the present invention, the backlight control circuit typically being used in an LCD.
Figure 3:
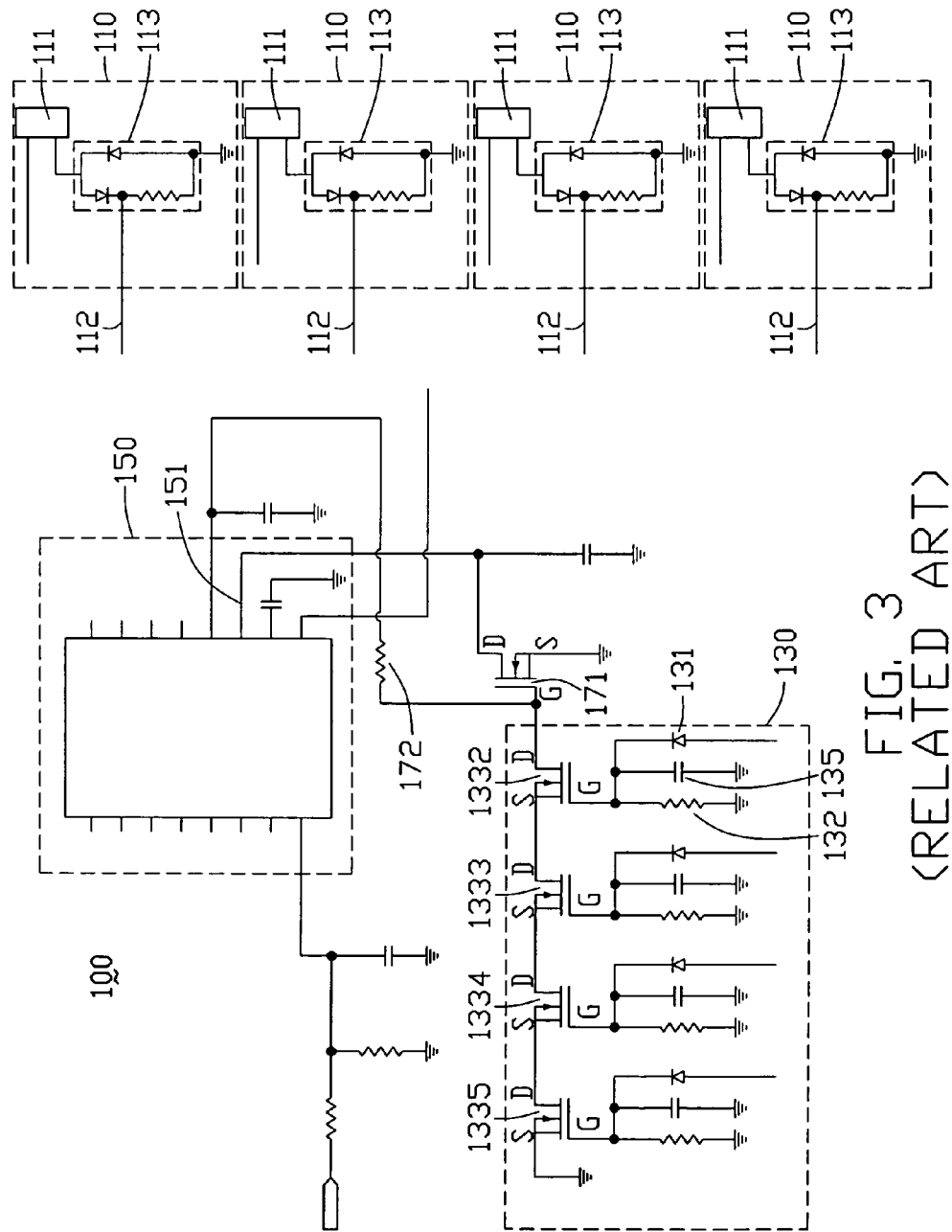
FIG. 3 is an abbreviated diagram of a conventional backlight control circuit used in an LCD.

FIG. 2 is an abbreviated diagram of a backlight control circuit according to a second embodiment of the present invention, the backlight control circuit typically being used in an LCD. The backlight control circuit 300 includes four load circuits 310, 320, 380, 390, a PWM IC 350, and a backlight protection circuit (not labeled). The backlight protection circuit includes a switching circuit 370, a first input circuit 330, and a second input circuit 340.

The load circuit 310 includes a backlight 311 and a backlight inspecting circuit 313 connected in series between a power supply (not shown) and ground. The backlight inspecting circuit 313 includes an output end 312.

The load circuit 320 includes a backlight 321 and a backlight inspecting circuit 323 connected in series between a power supply (not shown) and ground. The backlight inspecting circuit 323 includes an output end 322.

The load circuit 380 includes a backlight 381 and a backlight inspecting circuit 383 connected in series between a power supply (not shown) and ground. The backlight inspecting circuit 383 includes an output end 382.

The load circuit 390 includes a backlight 391 and a backlight inspecting circuit 393 connected in series between a power supply (not shown) and ground. The backlight inspecting circuit 393 includes an output end 392.

Each of the output ends 312, 322, 382, 392 provides a high voltage when each of the corresponding backlights 311, 321, 381, 391 works. Each of the output ends 312, 322, 382, 392 provides a low voltage when each of the corresponding backlights 311, 321, 381, 391 has an open circuit or a short circuit connecting to ground.

The PWM IC 350 includes a current sampling pin 351. The PWM IC 350 stops working if the current sampling pin 351 has a low voltage.

The switching circuit 370 includes a first transistor 371, a second transistor 372, a current limiting resistor 373, and a bias resistor 374. Each of the transistors 371, 372 includes an emitter electrode "e", a collector electrode "c", and a base electrode "b". The emitter electrodes "e" of the first and second transistors 371, 372 are connected to ground. The collector electrode "c" of the first transistor 371 is connected to the current sampling pin 351 of the PWM IC 350. The collector electrode "c" of the second transistor 372 is connected to the base electrode "b" of the first transistor 371, and is connected to a direct current power supply via the current limiting resistor 373. The base electrode "b" of the second transistor 372 is connected to ground via the bias resistor 374. The power supply is provided by a power pin (not labeled) of the PWM IC 350, and is typically a five volt direct current power supply.

The first input circuit 330 includes two diodes 331, two resistors 332, two capacitors 333, and two voltage division resistors 334. A negative terminal of each diode 331 is connected to ground via the corresponding resistor 332 and via the corresponding capacitor 333 respectively, and is connected to the base electrode "b" of the second transistor 372 via the corresponding voltage division resistor 334. A positive terminal of one of the diodes 331 is connected to the output end 382 of the backlight inspecting circuit 383. A positive terminal of the other diode 331 is connected to the output end 392 of the backlight inspecting circuit 393.

The second input circuit 340 includes two input resistors 341, 342. The output end 312 of the backlight inspecting circuit 313 is connected to the current sampling pin 351 of the PWM IC 350 via the input resistor 341. The output end 322 of the backlight inspecting circuit 323 is connected to the current sampling pin 351 of the PWM IC 350 via the input resistor 342.

The diodes 331 can for example be SN4148 type diodes. A resistance of the current limiting resistor 373 is preferably 1MΩ. A resistance of each of the voltage division resistors 334 is preferably 10KΩ. A resistance of the bias resistor 374 is preferably 1.5KΩ. The PWM IC 350 can for example be an OZ9910G type PWM IC. The first transistor 371 and the second transistor 372 can be negative-channel metal oxide semiconductor (NMOS) type transistors or negative-positive-negative (NPN) type transistors.

Generally, operation of the backlight control circuit 300 is as follows. When the backlights 311, 321 of the load circuits 310, 320 work, the corresponding output ends 312, 322 of the backlight inspecting circuits 313, 323 respectively provide a high voltage to the current sampling pin 351 of the PWC IC 350 via the input resistors 341, 342. When the backlights 381, 391 of the load circuits 380, 390 work, the corresponding output ends 382, 392 of the backlight inspecting circuits 383, 393 respectively provide a high voltage to the base electrode "b" of second transistor 372 via the respective diodes 331. Then the second transistor 372 is switched to be in an activated state, and the base electrode "b" of the first transistor 371 is connected to ground via the activated second transistor 372. Thus, the first transistor 371 is turned off, and the current sampling pin 351 of the PWM IC 350 maintains the high voltage and keeps working.

When the backlight 381 or the backlight 391 has an open circuit or a short circuit connecting to ground, the output end 382 or the output end 392 provides a low voltage to the base electrode "b" of second transistor 372 via the corresponding diode 331. Then the second transistor 372 is turned off, so that the base electrode "b" of the first transistor 371 is charged to a high voltage by the direct current power supply via the current limiting resistor 373. Thus the first transistor 371 is switched to be in an activated state, so that the current sampling pin 351 of the PWM IC 350 is connected to ground via the activated first transistor 371. Then the current sampling pin 351 of the PWM IC 350 is discharged to the low voltage, and the PWM IC 350 stops working.

When the backlight 311 or the backlight 321 has an open circuit or a short circuit connecting to ground, the output end 312 or the output end 322 directly provides a low voltage to the current sampling pin 351 of the PWM IC 350 via the input resistor 341 or the input resistor 342. Thus, the PWM IC 350 stops working.

The backlight control circuit 300 needs only two transistors 371, 372 to carry out the function of protecting the backlights 311, 321, 381, 391. Therefore, the backlight control circuit 300 has low cost.

It is to be understood, however, that even though numerous characteristics and advantages of preferred and exemplary embodiments have been set out in the foregoing description, together with details of the structures and functions of the embodiments, the disclosure is illustrative only; and that changes may be made in detail, especially in matters of shape, size, and arrangement of parts within the principles of present invention to the full extent indicated by the broad general meaning of the terms in which the appended claims are expressed.

What is claimed is:

1. A backlight control circuit comprising:
   a first load circuit comprising a first backlight and a first backlight inspecting circuit connected in series, the first backlight inspecting circuit comprising a first output end;
   a second load circuit comprising a second backlight and a second backlight inspecting circuit connected in series, the second backlight inspecting circuit comprising a second output end;
   a pulse width modulation integrated circuit (PWM IC) comprising a current sampling pin;

a switching circuit comprising a first transistor, a second transistor, a current limiting resistor, and a bias resistor, the first transistor comprising an emitter electrode connected to ground, a collector electrode connected to the sampling pin of the PWM IC, and a base electrode, the second transistor comprising an emitter electrode connected to ground, a collector electrode connected to the base electrode of the first transistor, and a base electrode connected to the ground via the bias resistor;

a first input circuit comprising:
  a first resistor;
  a first capacitor;
  a first voltage division resistor; and
  a first diode comprising a positive terminal connected to the first output end of the first backlight inspecting circuit, and a negative terminal connected to ground via the first resistor and the first capacitor respectively, the negative terminal also connected to the base electrode of the second transistor via the first voltage division resistor; and a second input circuit comprising a first input resistor, the second output end of the second backlight inspecting circuit connected to the current sampling pin of the PWM IC via the first input resistor.

2. The backlight control circuit as claimed in claim 1, further comprising:
  a third load circuit comprising a third backlight and a third backlight inspecting circuit connected in series, the third backlight inspecting circuit comprising a third output end; and
  a fourth load circuit comprising a fourth backlight and a fourth backlight inspecting circuit connected in series, the fourth backlight inspecting circuit comprising a fourth output end;
  wherein the first input circuit further comprises:
    a second resistor;
    a second capacitor;
    a second voltage division resistor; and
    a second diode comprising a positive terminal connected to the third output end of the third backlight inspecting circuit, and a negative terminal connected to ground via the second resistor and the second capacitor respectively, the negative terminal also connected to the base electrode of the second transistor via the second voltage division resistor; and
  the second input circuit further comprises a second input resistor, the fourth output end of the fourth backlight inspecting circuit connected to the current sampling pin of the PWM IC via the second input resistor.

3. The backlight control circuit as claimed in claim 1, wherein either or both of the first and second transistors are negative-channel metal oxide semiconductor (NMOS) type transistors.

4. The backlight control circuit as claimed in claim 1, wherein either or both of the first and second transistors are negative-positive-negative (NPN) type transistors.

5. The backlight control circuit as claimed in claim 1, further comprising a current limiting resistor, the base electrode of the first transistor configured to be connected to a power supply via the current limiting resistor.

6. The backlight control circuit as claimed in claim 5, wherein a resistance of the current limiting resistor is approximately equal to 1.0MΩ.

7. The backlight control circuit as claimed in claim 5, wherein the power supply is a five volt direct current power supply.

8. The backlight control circuit as claimed in claim 1, wherein a resistance of the first input resistor is approximately equal to 3.9KΩ.

9. The backlight control circuit as claimed in claim 1, wherein a resistance of the bias resistor is approximately equal to 1.5KΩ.

10. The backlight control circuit as claimed in claim 1, wherein a resistance of the first voltage division resistor is approximately equal to 5KΩ.

11. The backlight control circuit as claimed in claim 2, wherein a resistance of the first voltage division resistor is approximately equal to 10KΩ, a resistance of the second voltage division resistor is approximately equal to or 10KΩ.

12. A backlight control circuit comprising:
  a first load circuit comprising a first backlight and a first backlight inspecting circuit connected in series, the first backlight inspecting circuit comprising a first output end;
  a second load circuit comprising a second backlight and a second backlight inspecting circuit connected in series, the second backlight inspecting circuit comprising a second output end;
  a pulse width modulation integrated circuit (PWM IC) comprising a current sampling pin;
  a switching circuit comprising a first transistor, a second transistor, a current limiting resistor, and a bias resistor, the first transistor comprising an emitter electrode connected to ground, a collector electrode connected to the sampling pin of the PWM IC, and a base electrode, the second transistor comprising an emitter electrode connected to ground, a collector electrode connected to the base electrode of the first transistor, and a base electrode connected to the ground via the bias resistor;
  a first input circuit comprising:
    a first resistor;
    a first capacitor;
    a first voltage division resistor; and
    a first diode comprising a positive terminal connected to the first output end of the first backlight inspecting circuit, and a negative terminal connected to ground via the first resistor and the first capacitor respectively, the negative terminal also connected to the base electrode of the second transistor via the first voltage division resistor.

* * * * *